Jan. 12, 1937.   V. W. STRODE   2,067,425
PRIMER VALVE
Filed Sept. 3, 1935
Fig.1.
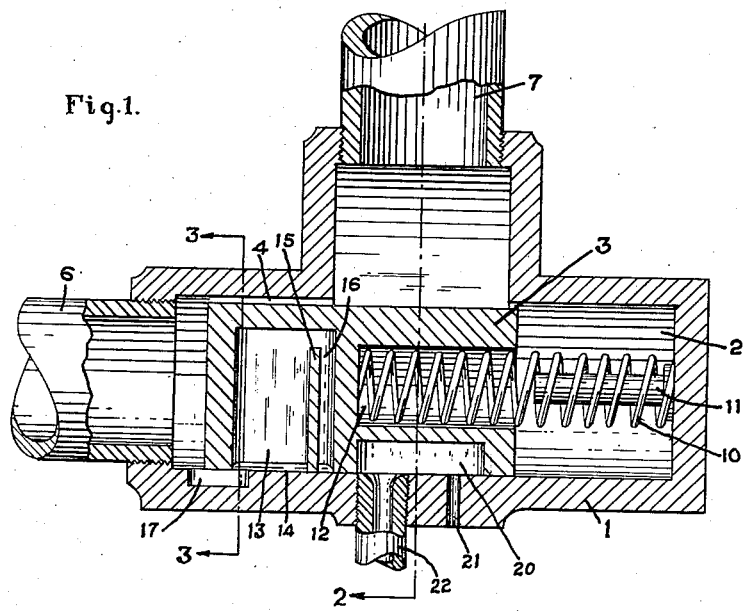
Fig.2.
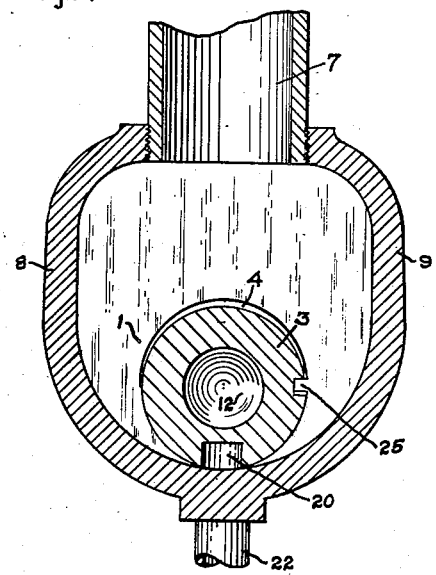
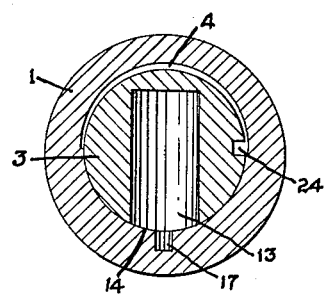
Fig.3.
Inventor
Victor W. Strode
By Rudolph B. Prentice
Attorney Patented Jan. 12, 1937

2,067,425

UNITED STATES PATENT OFFICE 2,067,425

PRIMER VALVE

Victor W. Strode, Portland, Oreg.

Application September 3, 1935, Serial No. 38,947

7 Claims. (Cl. 182—12)

My invention relates to improvements in primer valves for drain traps, humidifier pans, and other apparatus requiring frequent replenishment of the water element therein, operated automatically by the flow of water to customary plumbing fixtures served by common pipes, and supplying to said apparatus predetermined quantities of water under pressure at one phase alternately with air at atmospheric pressure at another phase.

Primer valves are a well known part of sanitary plumbing systems and are required in a great many plumbing codes, especially in the larger cities of the United States. They are required to be installed in the supply line to a frequently used fixture, such as a kitchen sink, a lavatory, or a toilet fixture.

A disadvantage of prior primers has been that they delivered a constant small stream during the entire time the master fixture was open, which is a great deal more than is required. They will also open when the master fixture is leaking due to being out of repair, thus aggravating the loss of water.

The principal object of my invention is a primer valve that will supply a definitely measured amount of water to a fixture that requires frequent priming, each time the master fixture is opened and regardless of how long the master fixture remains in sustained use.

Another object of my invention is to adapt the old slide valve with its well known self-cleaning characteristics to primer valve structures.

A further object is an improved venting means that will normally vent the delivery pipe to the primed fixture to prevent any possibility of back siphoning in case of vacuum in the main valve body; with further provision that such vacuum conditions will lift the control slide valve from its seat and thus break any vacuum that can form in the supply pipe due to a fire engine drawing extraordinary quantities of water or due to large use of water from any other cause, thus not only protecting against back siphonage from a primed fixture but protecting the entire water supply system of the building in which it is installed from cross-connection pollution.

Other objects and advantages of my invention will be apparent in the following specification wherein the significance of the reference characters in the accompanying drawing, details of construction of a valve embodying my invention, and the particular advantages thereof are explained.

Figure 1 represents a view of a longitudinal vertical section of a valve illustrating means for accomplishing the objects of my invention.

Figure 2 represents a view of a cross section taken on the line 2—2 of Figure 1 wherefrom the spring has been removed.

Figure 3 represents a view of a cross section taken on the line 3—3 of Figure 1.

The body of the valve 1 is formed with a chamber 2 containing a piston 3 slidable reciprocally therein and pressure seated in contact with the lower portion of the walls of chamber 2 and in spaced relation to the upper portions of the walls of chamber 2 so that a space 4 between the said piston 3 and chamber wall is provided.

The water service pipe 6 connected with a source of supply and the pipe 7 leading to the customary plumbing fixtures are joined by the valve of my invention as illustrated in Figure 1.

Medially of the ends of the chamber 2 lateral extensions thereof embraced by the extended valve-body portions 8 and 9 in Figure 2 form ample passageway for the full capacity of the pipes 6 and 7.

A spring 10 mounted on the stud 11 on one end and bearing against the end of the recess 12 in the piston 3 serves to hold the piston 3 in its normal position as shown in Figure 1.

The piston 3 is formed in further detail with a measuring chamber 13 the lower wall of which 14 is formed by the lower portion of the valve body beneath said chamber. A partition 15 integral with the piston 3 divides the measuring chamber 13 to form a vertical port 16 communicating therewith only at the top.

In that position of the piston shown in Figure 1 the measuring chamber 13 is so disposed as to extend at the left extremity thereof over a port 17 which serves to connect the chamber 13 with that portion of the valve body adjacent the supply pipe 6 included between the piston 3 and said supply pipe.

The piston is further formed with another chamber 20 normally disposed to interconnect the vent 21 and the discharge pipe 22. To prevent rotation of the piston 3 and constrain the same to simple reciprocatory motion longitudinally of the valve, a longitudinal groove 24 in the piston is engaged by a suitable projection of the valve body 1 as shown at 25 in Figure 2.

Thus, the piston 3 is in effect a fluid pressure seated slide-valve operating in contact with the lower interior surface of the valve body 1 to interconnect the several ports and chambers as follows:

When an appreciable flow of water through the valve from pipe 6 to pipe 7 is occasioned by the drawing of water in any of the fixtures served thereby, the piston 3 will be moved against the resistance of the spring 10 away from the inflow end of the valve through such distance as will allow of the free flow of water from pipe 6 to pipe 7. Upon the closing of the fixture from which water is thus being drawn, the spring 10 acts to return the piston 3 to its normal position as shown in Figure 1. At the other extremity of travel of the piston 3 than that shown in Figure 1, the port 16 will be apposed with the vent 21 and the chamber 13 apposed with the discharge pipe 22, thus connecting vent 21 with discharge pipe 22 through the port 16 and chamber 13.

The operation of the valve is as follows:

The chamber 13 will be partially filled with water under the pressure of the system in which the valve is employed, and a volume of air will be trapped in the upper part of the chamber 13 and compressed to the pressure of the water. When a fixture is opened the piston 3 is moved to the alternate position and the chamber 13 passes over the discharge pipe 22 and the port 16 over the vent 21 in the order named.

As soon as the lower end of the divisional chamber 16 passes into communication with the outlet port 22, the contents of 16 and the air will be immediately discharged. 16 will then move over and into approximate registry with the atmospheric vent 21 and vent the measuring chamber 13 from the top, thus preventing escape of water through the vent 21.

On the first apposition of the chamber 13 with the pipe 22 the trapped air contained in the upper part of the chamber will expand and force the water contained therein out through the discharge pipe 22. On the apposition of the port 16 with the vent 21 the pipe 22 will be opened to the atmosphere and the chamber 13 recharged with fresh air.

It is to be observed that a predetermined quantity of water will in this manner be delivered into the outlet port at each operation of the valve; that back-syphoning of a trap served by the valve will be effectually prevented by the entrance of air through the vent 21, chamber 20, and discharge pipe 22 leading to said trap; that communication between the pipes 6 and 7 is never completely obstructed to interfere with proper drainage of the water system; and that the operation of the piston will be smooth and noiseless due to the cushioning effect of the chambers at both ends of travel of the piston.

Since the slide valve is pressure seated and is provided with room to leave its seat, any unusual draft of water from the supply system, tending to establish vacuum conditions within the body of the valve will immediately break contact of the valve with its seat and by virtue of the atmospheric vent port 21 the entire water supply system will be protected against cross-connection pollution that might occur under vacuum conditions.

Having described my invention what I claim is:

1. A primer valve comprising a body member that is adapted for insertion in a water supply line, a valve seat within said body, an outlet port within the boundary of said valve seat, a slide valve reciprocably mounted on said seat and a measuring chamber formed in said valve that is positioned to fill under no flow conditions in the body, the said valve being movable under the influence of fluid flow, to discharge the contents of the measuring chamber through the outlet port.

2. The combination according to claim 1 characterized by an atmospheric vent port positioned to be placed in communication with the outlet port by movement of the slide valve to normal position.

3. In a primer valve of the character described, including a slide valve and a measuring chamber formed in the body of the valve, an outlet port and a vent port positioned to be controlled by movement of said slide valve, a member in said measuring chamber that is effective to prevent the liquid contents of said chamber from discharging through the vent port.

4. In a primer valve of the character described, a pressure seated slide valve, an outlet port and an atmospheric vent port positioned to be controlled by said valve and a spring positioned to normally move the valve to closed position with respect to said ports, the said valve being arranged to leave its seat and vent the interior of the primer valve under the influence of vacuum therein.

5. A valve body structure having inlet and outlet connections and an intermediate outlet, a valve member in said body that contains a chamber, the said valve member being movable under the influence of intermittent flow through said body to alternately fill said chamber and discharge its contents through said intermediate outlet.

6. A primer valve for supplying a measured amount of water to a fixture, defined in part as a body member, inlet and outlet connections therefor that are adapted to connect the body member in a water supply pipe, a slide valve within the said body member that is movable in one direction under the influence of fluid flow through the body and in the other direction under the influence of a spring, a measuring chamber within the slide valve, a port positioned to fill the measuring chamber under conditions of no flow through the pipe and a port to discharge the contents thereof to a fixture when the slide valve moves under the influence of fluid flow.

7. A primer valve as characterized in claim 6 and including an air port positioned to connect the said discharge port to atmosphere when the valve is in normal position.

VICTOR W. STRODE.